(12) United States Patent
Saxena et al.

(10) Patent No.: US 11,282,180 B1
(45) Date of Patent: Mar. 22, 2022

(54) OBJECT DETECTION WITH POSITION, POSE, AND SHAPE ESTIMATION

(71) Applicants: Shreyas Saxena, Mountain View, CA (US); Cuneyt Oncel Tuzel, Cupertino, CA (US); Pavan Kumar Anasosalu Vasu, Sunnyvale, CA (US)

(72) Inventors: Shreyas Saxena, Mountain View, CA (US); Cuneyt Oncel Tuzel, Cupertino, CA (US); Pavan Kumar Anasosalu Vasu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 16/857,221

(22) Filed: Apr. 24, 2020

Related U.S. Application Data

(60) Provisional application No. 62/837,744, filed on Apr. 24, 2019.

(51) Int. Cl.
*G06T 7/00* (2017.01)
*G06T 7/60* (2017.01)
*G06T 7/70* (2017.01)
*G06V 20/20* (2022.01)

(52) U.S. Cl.
CPC .............. *G06T 7/0002* (2013.01); *G06T 7/60* (2013.01); *G06T 7/70* (2017.01); *G06V 20/20* (2022.01); *G06T 2207/10028* (2013.01); *G06T 2207/20224* (2013.01)

(58) Field of Classification Search
CPC .......... G06T 7/0002; G06T 7/60; G06T 7/70; G06T 2207/10028; G06T 2207/20224; G06K 9/00671
See application file for complete search history.

(56) References Cited

U.S. PATENT DOCUMENTS

| | | | |
|---|---|---|---|
| 8,300,950 B2 | 10/2012 | Ito et al. | |
| 9,928,418 B2 | 3/2018 | Segalovitz et al. | |
| 10,013,750 B2 | 7/2018 | Zhang et al. | |
| 10,055,667 B2 | 8/2018 | Konolige et al. | |
| 10,235,771 B2 | 3/2019 | Rad et al. | |
| 2006/0067573 A1* | 3/2006 | Parr | G06K 9/00 382/154 |

(Continued)

FOREIGN PATENT DOCUMENTS

| | | |
|---|---|---|
| CN | 106250863 A | 12/2016 |
| CN | 107704866 A | 2/2018 |
| CN | 108229490 A | 6/2018 |

*Primary Examiner* — Qian Yang (74) *Attorney, Agent, or Firm* — Young Basile Hanlon & MacFarlane, P.C.

(57) ABSTRACT

A method includes determining a detection output that represents an object in a two-dimensional image using a detection model, wherein the detection output includes a shape definition that describes a shape and size of the object; defining a three-dimensional representation based on the shape definition, wherein the three-dimensional representation includes a three-dimensional model that represents the object that is placed in three-dimensional space according to a position and a rotation; determining a three-dimensional detection loss that describes a difference between the three-dimensional representation and three-dimensional sensor information; and updating the detection model based on the three-dimensional detection loss.

27 Claims, 8 Drawing Sheets

(56) References Cited

U.S. PATENT DOCUMENTS

| | | | |
|---|---|---|---|
| 2007/0031028 A1* | 2/2007 | Vetter | G06T 7/70 |
| | | | 382/154 |
| 2015/0003723 A1 | 1/2015 | Huang et al. | |
| 2015/0097768 A1* | 4/2015 | Holz | G02B 5/04 |
| | | | 345/156 |
| 2015/0213646 A1 | 7/2015 | Ma et al. | |
| 2015/0254499 A1 | 9/2015 | Pang et al. | |
| 2017/0243352 A1 | 8/2017 | Kutliroff et al. | |
| 2018/0012411 A1 | 1/2018 | Richey et al. | |
| 2018/0018805 A1 | 1/2018 | Kutliroff et al. | |
| 2018/0137642 A1 | 5/2018 | Malisiewicz et al. | |
| 2018/0189611 A1 | 7/2018 | Dal Mutto et al. | |
| 2018/0268601 A1 | 9/2018 | Rad et al. | |
| 2019/0026917 A1 | 1/2019 | Liao et al. | |
| 2019/0088004 A1 | 3/2019 | Lucas et al. | |
| 2020/0175315 A1* | 6/2020 | Gowaikar | G05D 1/0088 |
| 2020/0211206 A1* | 7/2020 | Wang | G06N 20/00 |
| 2020/0250885 A1* | 8/2020 | Bian | G06T 7/55 |
| 2020/0311977 A1* | 10/2020 | Wood | G06T 3/4007 |

\* cited by examiner

OBJECT DETECTION WITH POSITION, POSE, AND SHAPE ESTIMATION

CROSS-REFERENCE TO RELATED APPLICATIONS

This application claims the benefit of U.S. Provisional Application No. 62/837,744, filed on Apr. 24, 2019, the content of which is incorporated herein by reference in its entirety for all purposes.

TECHNICAL FIELD

This disclosure relates to systems and methods for three-dimensional object detection.

BACKGROUND

Known object detection systems use two-dimensional and/or three-dimensional sensor inputs to attempt to identify the presence of an object in an image. Some of these systems attempt to determine two-dimensional position and pose or three-dimensional position and pose. When these systems are implemented using machine learning techniques, such as in the form of a deep neural network (DNN), large numbers of training examples are used. These training examples may be annotated, for example, with information showing, presence, position, and pose of objects in two or three dimensions.

SUMMARY

One aspect of the disclosure is a method that includes determining a detection output that represents an object in a two-dimensional image using a detection model. The detection output includes a shape definition that describes a shape and size of the object. The method also includes defining a three-dimensional representation based on the shape definition. The three-dimensional representation includes a three-dimensional model that represents the object that is placed in three-dimensional space according to a position and a rotation. The method also includes determining a three-dimensional detection loss that describes a difference between the three-dimensional representation and three-dimensional sensor information. The method also includes updating the detection model based on the three-dimensional detection loss.

Another aspect of the disclosure is a method that includes obtaining a two-dimensional image, obtaining a two-dimensional image annotation that indicates presence of an object in the two-dimensional image, and obtaining three-dimensional sensor information. The method also includes determining a detection output that represents the object in the two-dimensional image using a detection model, wherein the detection output includes a shape definition for the object, and estimating a position and a rotation using the detection output. The method also includes defining a three-dimensional representation based on the position, the rotation, and the shape definition for the object, and determining a three-dimensional detection loss that describes a difference between the three-dimensional representation and the three-dimensional sensor information. The method also includes projecting features from the three-dimensional representation into two-dimensional space to define a two-dimensional representation, determining a two-dimensional detection loss based on the two-dimensional representation and the two-dimensional image annotation, and updating the detection model based on the three-dimensional detection loss and the two-dimensional detection loss.

Another aspect of the disclosure is a method that includes obtaining a two-dimensional image, obtaining a two-dimensional image annotation that indicates presence of an object in the two-dimensional image, and obtaining three-dimensional sensor information. The method also includes detecting a position, rotation, and shape definition for the object in the two-dimensional image using a detection model, defining a three-dimensional representation based on the position, the rotation, and the shape definition for the object, and determining a three-dimensional detection loss that describes a difference between the three-dimensional representation and the three-dimensional sensor information. The method also includes projecting features from the three-dimensional representation into two-dimensional space to define a two-dimensional representation, determining a two-dimensional detection loss based on the two-dimensional representation and the two-dimensional image annotation, and updating the detection model based on the three-dimensional detection loss and the two-dimensional detection loss.

DETAILED DESCRIPTION

The systems and methods that are described herein generate three-dimensional estimates of the position, orientation, and shape of an object that is seen in a two-dimensional image. These systems are machine learning-based systems (e.g., including a deep neural network (DNN) or other machine learning model) that are trained using two-dimensional keypoint data, unlabeled three-dimensional depth data, and a library of three-dimensional models. The three-dimensional models are used to automate determination of a three-dimensional loss value relative to unlabeled three-dimensional sensor information during training.

To aid processing of this information, an allocentric frame of reference in used for parameterization. Distances are referenced along a ray that is constructed from a host (e.g., from an optical center of a camera or other sensor of the host) and angular orientations for the objects are referenced relative to the ray that is constructed from the host. Effectively, this defines a polar coordinate space that is centered on the host. As a result of this parameterization, the values processed by the machine learning system are translation independent. In an example in which the objects being detected by the system are vehicles, the vehicles will be appear different to the host as a function of their lateral translation relative to the host regardless of the fact that their angular rotations—as referenced relative to Cartesian-coordinate space—are identical. On the contrary, in the parameterization used herein, by parameterizing angles relative to a ray constructed between the host and the object, identical angular rotation values for objects result in similar appearances in images captured by the host regardless of lateral translation of the objects relative to the host.

In the systems and methods described herein, a trained object detection system takes an image as input, and outputs the pose and shape of the objects present in a scene. During testing of example systems that are implemented according to the description herein, the time required for processing an image is low enough to allow use in real-time applications (e.g., forty milliseconds).

In an implementation, the object detection system includes standard convolutional layers, followed by anchors at multiple feature maps that predict shape and six degree-of-freedom pose parameters in addition to a two-dimensional box and class label. During training, there are no annotations for rotation, translation and shape of object instances in the scene, so losses are introduced to provide indirect supervision for shape and pose prediction. During training, estimates of shape and pose are output by the detection model (e.g., a trained DNN), and a three-dimensional loss function (e.g., chamfer loss) is used to measure agreement between reconstructed three-dimensional object instances and unlabeled depth data (e.g., a LIDAR point cloud).

In addition to the loss in three-dimensional space, loss is induced in two-dimensional image space using keypoint annotations. The shape model may include three-dimensional keypoints that are defined on the mesh. The three-dimensional keypoints are projected onto the image and keypoint reprojection loss is measured relative to the two-dimensional keypoints.

Figure 1:
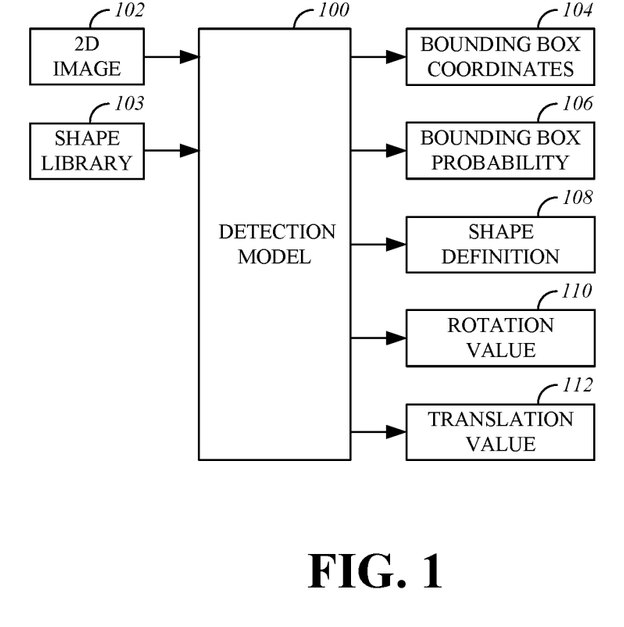
FIG. 1 is a block diagram that shows a trained detection model.

FIG. 1 is a block diagram that shows a trained detection model 100. The trained detection model 100 receives an image 102 as an input and is able to use a shape library 103. The trained detection model 100 may produce, as outputs, any or all of bounding box coordinates 104, a keypoint estimate 106, a shape definition 108, a rotation value 110, and a translation value 112.

The trained detection model 100 is trained using two-dimensional images, two-dimensional keypoint annotations, and unlabeled depth data (e.g., a LIDAR point cloud). Three-dimensional sensor inputs are not used by the trained detection model 100 at run time. Training of the trained detection model 100 will be described herein. The image 102 is a representation of an environment in which objects are being detected. The image 102 may be captured using a camera or obtained by other means. As an example, the image 102 may be in a digital format that defines an array of pixel values. The image 102 may be a visible spectrum image, or may be other than a visible spectrum image (e.g., infrared).

The bounding box coordinates 104 describe the location of an object in the image (e.g., data referenced in image space that defines a box, or outline). As an example, the bounding box coordinates 104 may describe the corners of a rectangle. It should be understood that the bounding box coordinates 104 represent a manner of describing the area of an image that corresponds to an object. Other types of geometric definitions may be used, such as the center and radius of a circle, or vertex coordinates for a polygon having any number of sides. A bounding box probability may also be output by the trained detection model 100 to represent the likelihood that the bounding box coordinates 104 correctly represent the location of the object.

The keypoint estimate 106 includes information that identifies one or more locations in the two-dimensional image that correspond to keypoints. The one or more locations may be described, for example, by a coordinate pair (e.g., an X-coordinate and a Y-coordinate) that are expressed in image space. As used herein, the term keypoints refers to specific locations on an object that provide a repeatable basis for determining position and pose across many objects having different shapes and sizes. With respect to vehicles, keypoints may be locations where tires meet an underlying surface, keypoints may be headlights or taillights, or keypoints may be defined elsewhere.

The shape definition 108 describes the shape and size of the object as understood by the trained detection model 100. As one example, the shape definition 108 may identify a pre-existing shape model that is present in the shape library 103, which is accessible by the trained detection model 100. As another example, the shape definition 108 may be a parametric model that describes how other models (e.g., primitives or representative objects of a similar type) from the shape library 103 can be combined (e.g., by linear or nonlinear interpolation) to define a shape that is similar to the shape of the object that has been detected in the image 102 by the trained detection model 100. In the example of vehicle detection, the shape definition may be defined by two or vehicle models (e.g., three-dimensional meshes) from the shape library 103. The trained detection model 100 selects the vehicle models, determines how to combine them (e.g., parameters describing the manner of combination), and includes this information in the shape definition 108. The shape definition 108 may include information that describes how to combine existing shapes or models, or may include a model (e.g., three-dimensional mesh) that is defined based on a combination of other shapes or models (e.g., three-dimensional meshes) from the shape library 103. Thus, the three-dimensional model that represents the object may be defined based on two or more models from a shape library.

Figure 2:
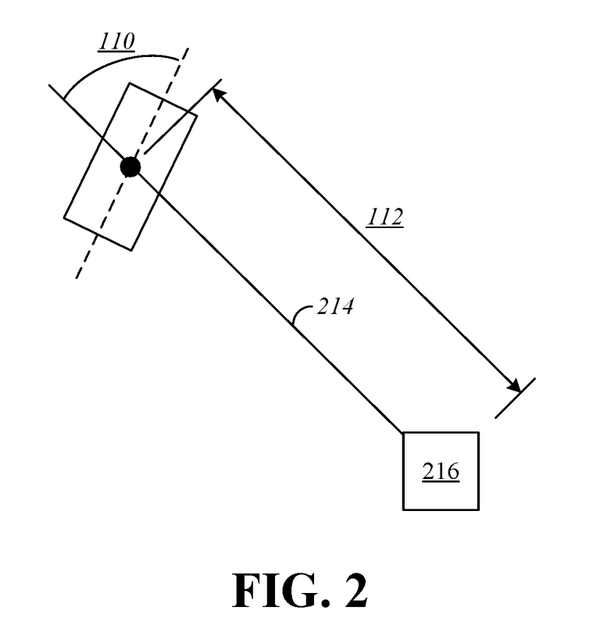
FIG. 2 is an illustration that shows an allocentric representation of object location.

As shown in FIG. 2, which is an illustration that shows an allocentric representation of object location, the rotation value 110 is determined by the trained detection model 100 by projection of a projected line 214 (e.g., a ray) that is defined between the imaging device 216 that captured the image 102 and the object. The projected line 214 may be projected in three-dimensional space or in two-dimensional space (e.g., from a top-down perspective) from the imaging device 216 that captured the image 102 to an estimated center point of the object. The rotation value 110 represents rotation of the object relative to the projected line. The translation value 112 represents the distance between the imaging device that captured the image 102 and the object along the projected line 214.

Figure 3:
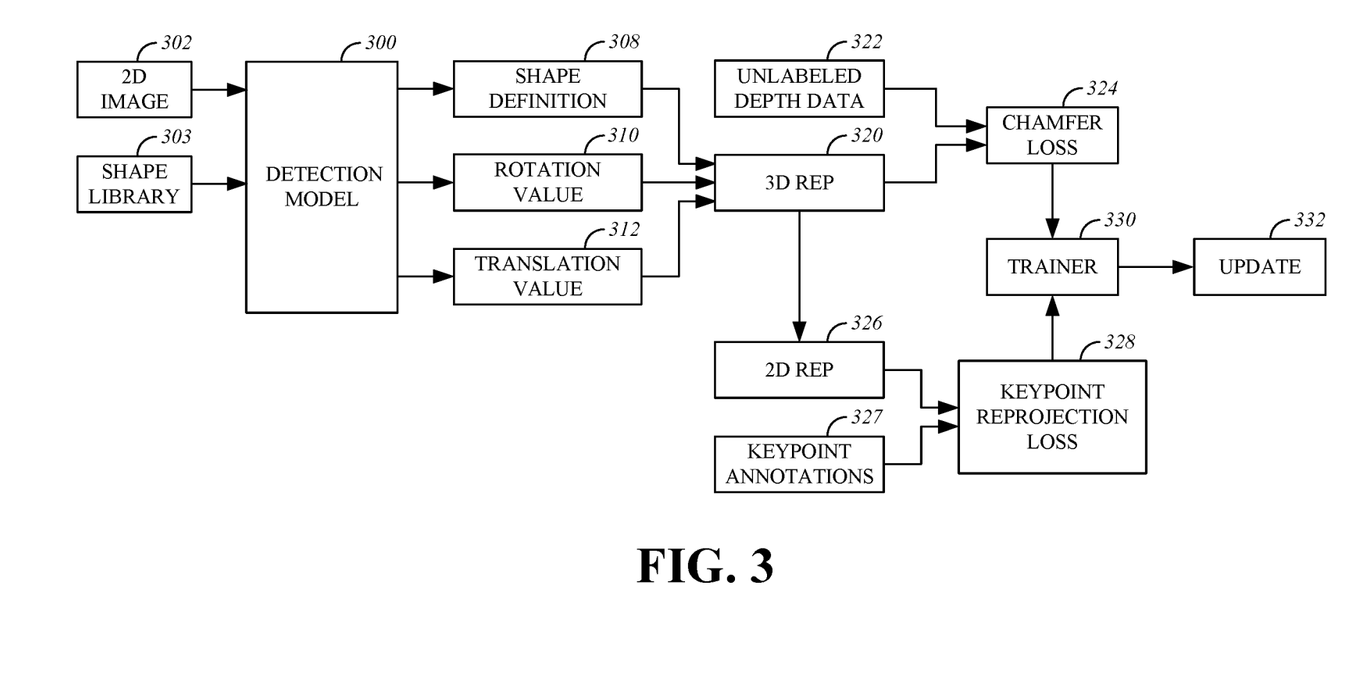
FIG. 3 is a block diagram that shows training of a detection model according to a first example.

FIG. 3 is a block diagram that shows training of a detection model 300, which, when trained, is consistent with the description of the trained detection model 100.

The detection model 300 is similar to the trained detection model 100, in that it receives an image 302 as an input has access to a shape library 303, and its outputs include a shape definition 308, a rotation value 310, and a translation value 312, all of which are as described previously with respect to FIG. 1. The detection model 300 may also generate other outputs, such as bounding boxes and keypoint estimates, as previously explained with respect to the detection model 100.

The shape definition 308, the rotation value 310, and the translation value 312 are used to construct a three-dimensional representation 320 (e.g., a scene including a model representing the object) of the object, in which the three-dimensional model that is defined using the shape definition 308 is placed in three-dimensional space relative to the image capture location according to the rotation value 310 and the translation value 312. The three-dimensional representation 320 is compared to unlabeled depth data 322. The unlabeled depth data 322 is information (e.g., a point cloud) that represents the presence of surfaces in three-dimensional space. The unlabeled depth data 322 is obtained at the same time as the two-dimensional image 302 and represents the same scene. The unlabeled depth data 322 can be obtained using a LIDAR sensor or other three-dimensional sensor.

If the three-dimensional representation 320 was a completely accurate representation of the shape, position, and pose of the object, a portion of the unlabeled depth data 322 and the three-dimensional representation 320 would be coincident. There will, however, be some degree of deviation and this is measured as a loss value that represents the difference between the two sets of three-dimensional data. In the illustrated example, the difference between the three-dimensional representation 320 and the unlabeled depth data 322 is measured as a three-dimensional loss 324. The three-dimensional loss 324 is a loss value representing distances between the points from the unlabeled depth data 322 and closest positions on the surfaces of the object in the three-dimensional representation 320.

As one example, the three-dimensional loss 324 may be determined using a chamfer loss function. Chamfer loss can be determined according to known algorithms. As an example, the unlabeled depth data can be filtered (e.g., by excluding ground plane points and remote points) to define a set of points in the area of the object in the three-dimensional representation 320. For each of the points in the unlabeled depth data 322, a distance between the point and the model of the object in the three-dimensional representation can be determined, and the chamfer loss is based on these distances. For example, the value of the chamfer loss may be an average distance between the points and the model. Other techniques can be used to determine chamfer loss. Other techniques for measuring differences between sets of three-dimensional data can be used to determine the three-dimensional loss 324 instead of or in addition to chamfer loss.

The three-dimensional representation 320 is used to generate a two-dimensional representation 326, by projecting the three-dimensional representation 320 into image space. Keypoints can be defined in the three-dimensional representation 320, and the keypoints can be projected into the two-dimensional representation 326.

The two-dimensional representation 326 is compared to keypoint annotations 327 to determine a two-dimensional loss, such as a keypoint reprojection loss 328 in the illustrated example. The keypoint reprojection loss 328 represents a degree of difference between the locations of keypoints in the keypoint annotations 327 and keypoints that are projected from the three-dimensional representation 320 into the two-dimensional representation 326. Other methods of comparing differences between sets of two-dimensional coordinates can be used to define two-dimensional loss values instead of or in addition to the keypoint reprojection loss 328.

The three-dimensional loss 324 and the keypoint reprojection loss 328 are provided to a trainer 330 as inputs. The trainer 330 is any manner of system, application, or technique for training a machine learning model (e.g., a DNN) such as the detection model 300. For example, the trainer 330 may, using loss values such as the three-dimensional loss 324 and the keypoint reprojection loss 328, utilize an optimization algorithm, such as stochastic gradient descent, to modify the detection model 300 by changing weights through backpropagation. The output of the trainer 330 may be an update 332 that is provided to the detection model 300 and applied to the detection model 300 to modify the detection model.

Figure 4:
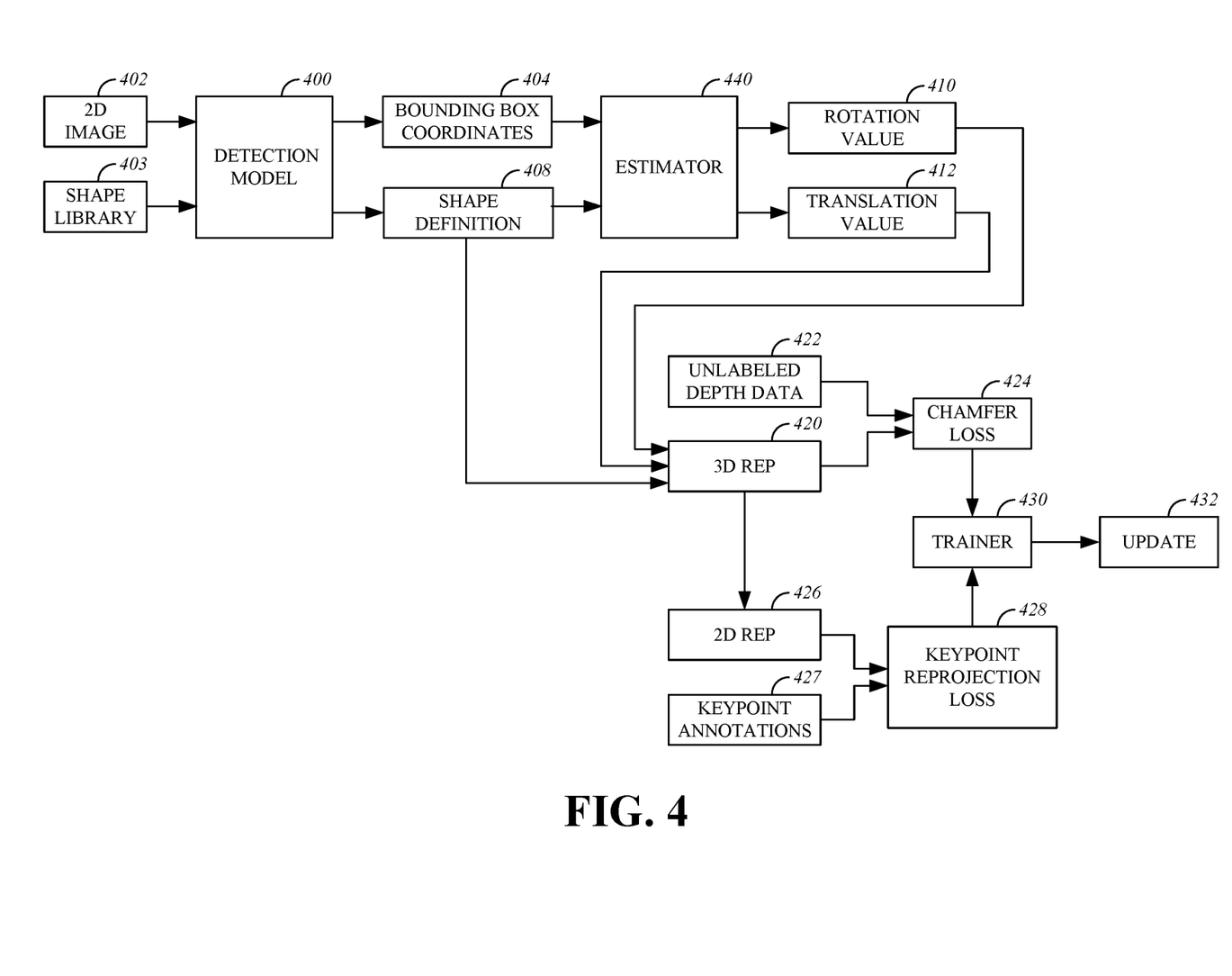
FIG. 4 is a block diagram that shows training of a detection model according to a second example.

FIG. 4 is a block diagram that shows training of a detection model 400, which, when trained, is consistent with the description of the trained detection model 100. Training of the detection model 400 is similar to training of the detection model 300, except that the rotation and translation values that are used to create the three-dimensional representation are estimated based on the bounding box coordinates and shape definition that are output by the detection model 400, as opposed to creating the three-dimensional representation using rotation and translation values that are output by the detection model directly.

The detection model 400 is similar to the trained detection model 100, in that it receives an image 402 as an input has access to a shape library 403, and its outputs may include any or all of bounding box coordinates 404 and a shape definition 408, all of which are as described previously with respect to FIG. 1. The detection model 400 may also generate other outputs, such as a keypoint estimate, a rotation value, and a translation value, as previously described.

The bounding box coordinates 404 and the shape definition 408 are provided as inputs to an estimator 440 that determines a rotation value 410 and a translation value 412. The rotation value 410 and the translation value 412 are similar to the rotation value 110 and the translation value 112, except that they are determined by the estimator 440 instead of by the detection model 400.

The estimator 440 may use geometric techniques to determine the location of the object being detected in three-dimensional space. As one example, a location of a center point of the bounding box coordinates 404 relative to the two-dimensional image 402 can be used to project a ray from the camera location at which the two-dimensional image was captured. The projected ray extends in three-dimensional space at an angle relative to the optical axis of the camera from the camera location and passes through the area in which the object is located. Using geometric techniques, the width of the bounding box from the bounding box coordinates 404 can be used to estimate the rotation value 410 (e.g., the rotation of the object from a top-down perspective relative to the projected ray) based on an estimated height of the object as given by the shape definition 408. Using geometric techniques, the height of the bounding box from the bounding box coordinates 404 can be used to estimate the translation value 412 (e.g., the distance along the projected ray between the camera location and the object) based on an estimated height of the object as given by the shape definition 408.

The shape definition 408, the rotation value 410, and the translation value 412 are used to construct a three-dimensional representation 420 (e.g., a scene including a model representing the object) of the object, in which the three-dimensional model that is defined using the shape definition 408 is placed in three-dimensional space relative to the image capture location according to the rotation value 410 and the translation value 412. The three-dimensional representation 420 is compared to unlabeled depth data 422. The unlabeled depth data 422 is information (e.g., a point cloud) that represents the presence of surfaces in three-dimensional space. The unlabeled depth data 422 is obtained at the same time as the two-dimensional image 402 and represents the same scene. The unlabeled depth data 422 can be obtained using a LIDAR sensor or other three-dimensional sensor.

If the three-dimensional representation 420 was a completely accurate representation of the shape, position, and pose of the object, a portion of the unlabeled depth data 422 and the three-dimensional representation 420 would be coincident. There will, however, be some degree of deviation and this is measured as a loss value that represents the difference between the two sets of three-dimensional data. In the illustrated example, the difference between the three-dimensional representation 420 and the unlabeled depth data 422 is measured as a three-dimensional loss 424. The three-dimensional loss 424 is a loss value that distances between the points from the unlabeled depth data 422 and closest positions on the surfaces of the object in the three-dimensional representation 420.

As one example, the three-dimensional loss 424 may be determined using a chamfer loss function. Chamfer loss can be determined according to known algorithms. As an example, the unlabeled depth data can be filtered (e.g., by excluding ground plane points and remote points) to define a set of points in the area of the object in the three-dimensional representation 420. For each of the points in the unlabeled depth data 422, a distance between the point and the model of the object in the three-dimensional representation can be determined, and the chamfer loss is based on these distances. For example, the value of the chamfer loss may be an average distance between the points and the model. Other techniques can be used to determine chamfer loss. Other techniques for measuring differences between sets of three-dimensional data can be used to determine the three-dimensional loss 424 instead of or in addition to chamfer loss.

The three-dimensional representation 420 is used to generate a two-dimensional representation 426, by projecting the three-dimensional representation 420 into image space. Keypoints can be defined in the three-dimensional representation 420, and the keypoints can be projected into the two-dimensional representation 426.

The two-dimensional representation 426 is compared to keypoint annotations 427 to determine a two-dimensional loss, such as a keypoint reprojection loss 428 in the illustrated example. The keypoint reprojection loss 428 represents a degree of difference between the locations of keypoints in the keypoint annotations 427 and keypoints that are projected from the three-dimensional representation 420 into the two-dimensional representation 426. Other methods of comparing differences between sets of two-dimensional coordinates can be used to define two-dimensional loss values instead of or in addition to the keypoint reprojection loss 428.

The three-dimensional loss 424 and the keypoint reprojection loss 428 are provided to a trainer 430 as inputs. The trainer 430 is any manner of system, application, or technique for training a machine learning model (e.g., a DNN) such as the detection model 400. For example, the trainer 430 may, using loss values such as the three-dimensional loss 424 and the keypoint reprojection loss 428, utilize an optimization algorithm, such as stochastic gradient descent, to modify the detection model 400 by changing weights through backpropagation. The output of the trainer 430 may be an update 432 that is provided to the detection model 400 and applied to the detection model 400 to modify the detection model.

The detection model 400 may be modified and extended in a number of ways. As one example, the detection model 400 may be configured to output a keypoint estimate that is compared to the keypoint annotations to determine a keypoint estimate loss that is provided as an input to the trainer 430. As another example, the estimator 440 may use the unlabeled depth data 422 as an additional input for determining the rotation value 410 and/or the translation value 412. For example, after estimating the translation value 412 as previously described, the estimator 440 may define surfaces at the location indicated by the translation value 412 using the unlabeled depth data 422 and use the surfaces as an additional basis for estimating the rotation value 410. As another example, the trainer 430 may use the keypoint annotations 427 as an additional input for use in estimating the rotation value 410 and/or the translation value 412. As another example, it is contemplated that the detection model 400, subsequent to training, may be configured to output rotation and translation values directly, or may continue to use the estimator at run time to determine the rotation value 410 and the translation value 412.

Figure 5:
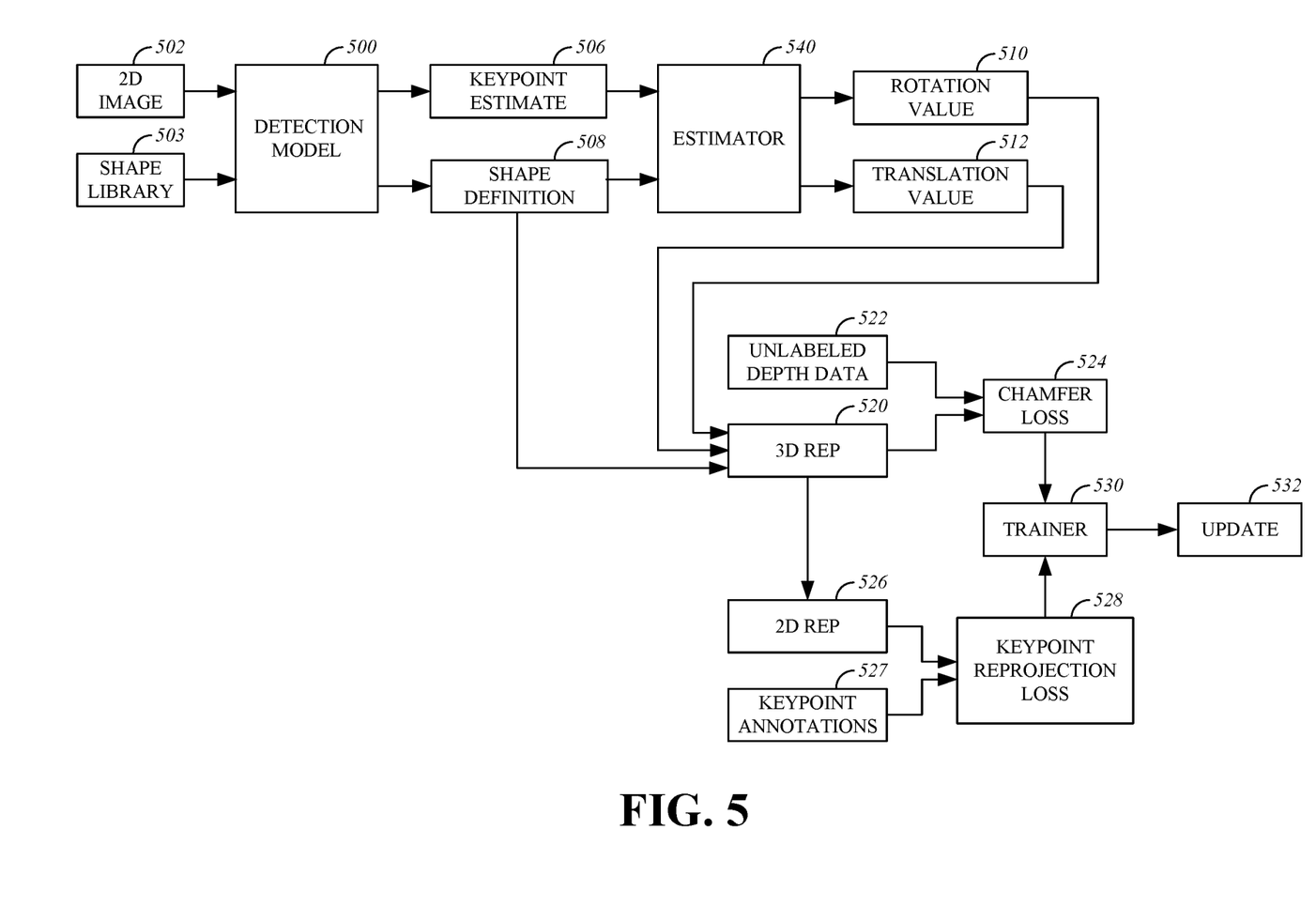
FIG. 5 is a block diagram that shows training of a detection model according to a third example.

FIG. 5 is a block diagram that shows training of a detection model 500, which, when trained, is consistent with the description of the trained detection model 100. Training of the detection model 500 is similar to training of the detection model 300, except that the rotation and translation values that are used to create the three-dimensional representation are estimated based on the keypoint estimate and shape definition that are output by the detection model, as opposed to creating the three-dimensional representation using rotation and translation values that are output by the detection model directly.

The detection model 500 is similar to the trained detection model 100, in that it receives an image 502 as an input has access to a shape library 503, and its outputs may include any or all of a keypoint estimate 506 and a shape definition 508, which are as described previously with respect to FIG. 1. The detection model 500 may also generate other outputs, such as a bounding box coordinates, a rotation value, and a translation value, as previously described.

The keypoint estimate 506 and the shape definition 508 are provided as inputs to an estimator 540 that determines a rotation value 510 and a translation value 512. The rotation value 510 and the translation value 512 are similar to the rotation value 110 and the translation value 112, except that they are determined by the estimator 540 instead of by the detection model 500.

The estimator 540 may use geometric techniques to determine the location of the object being detected in three-dimensional space. As one example, the relative location in two-dimensional image space of two or more keypoints from the keypoint estimate 506 can be used, along with the known relative locations of corresponding keypoints on the three-dimensional model given by the shape definition 508, can be used to determine the locations of the keypoints in three-dimensional space, which allows the model given by the shape definition 508 to be placed in three-dimensional space according to the keypoints. The resulting rotation and translation of the model can be used as the rotation value 510 and the translation value 512.

The shape definition 508, the rotation value 510, and the translation value 512 are used to construct a three-dimensional representation 520 (e.g., a scene including a model representing the object) of the object, in which the three-dimensional model that is defined using the shape definition 508 is placed in three-dimensional space relative to the image capture location according to the rotation value 510 and the translation value 512. The three-dimensional representation 520 is compared to unlabeled depth data 522. The unlabeled depth data 522 is information (e.g., a point cloud) that represents the presence of surfaces in three-dimensional space. The unlabeled depth data 522 is obtained at the same time as the two-dimensional image 502 and represents the same scene. The unlabeled depth data 522 can be obtained using a LIDAR sensor or other three-dimensional sensor.

If the three-dimensional representation 520 was a completely accurate representation of the shape, position, and pose of the object, a portion of the unlabeled depth data 522 and the three-dimensional representation 520 would be coincident. There will, however, be some degree of deviation and this is measured as a loss value that represents the difference between the two sets of three-dimensional data. In the illustrated example, the difference between the three-dimensional representation 520 and the unlabeled depth data 522 is measured as a three-dimensional loss 524. The three-dimensional loss 524 is a loss value that distances between the points from the unlabeled depth data 522 and closest positions on the surfaces of the object in the three-dimensional representation 520.

As one example, the three-dimensional loss 524 may be determined using a chamfer loss function. Chamfer loss can be determined according to known algorithms. As an example, the unlabeled depth data can be filtered (e.g., by excluding ground plane points and remote points) to define a set of points in the area of the object in the three-dimensional representation 520. For each of the points in the unlabeled depth data 522, a distance between the point and the model of the object in the three-dimensional representation can be determined, and the chamfer loss is based on these distances. For example, the value of the chamfer loss may be an average distance between the points and the model. Other techniques can be used to determine chamfer loss. Other techniques for measuring differences between sets of three-dimensional data can be used to determine the three-dimensional loss 524 instead of or in addition to chamfer loss.

The three-dimensional representation 520 is used to generate a two-dimensional representation 526, by projecting the three-dimensional representation 520 into image space. Keypoints can be defined in the three-dimensional representation 520, and the keypoints can be projected into the two-dimensional representation 526.

The two-dimensional representation 526 is compared to keypoint annotations 527 to determine a two-dimensional loss, such as a keypoint reprojection loss 528 in the illustrated example. The keypoint reprojection loss 528 represents a degree of difference between the locations of keypoints in the keypoint annotations 527 and keypoints that are projected from the three-dimensional representation 520 into the two-dimensional representation 526. Other methods of comparing differences between sets of two-dimensional coordinates can be used to define two-dimensional loss values instead of or in addition to the keypoint reprojection loss 528.

The three-dimensional loss 524 and the keypoint reprojection loss 528 are provided to a trainer 530 as inputs. The trainer 530 is any manner of system, application, or technique for training a machine learning model (e.g., a DNN) such as the detection model 500. For example, the trainer 530 may, using loss values such as the three-dimensional loss 524 and the keypoint reprojection loss 528, utilize an optimization algorithm, such as stochastic gradient descent, to modify the detection model 500 by changing weights through backpropagation. The output of the trainer 530 may be an update 532 that is provided to the detection model 500 and applied to the detection model 500 to modify the detection model.

The detection model 500 may be modified and extended in a number of ways. As one example, the detection model 500 may be configured to output a keypoint estimate that is compared to the keypoint annotations to determine a keypoint estimate loss that is provided as an input to the trainer 530. As another example, the estimator 540 may use the keypoint annotations 527 as a basis for estimating the rotation value 510 and the translation value 512 as opposed to using the keypoint estimate 506 that is output by the detection model 500. As another example, the estimator 540 may use the unlabeled depth data 522 as an additional input for determining the rotation value 510 and/or the translation value 512. For example, after estimating the translation value 512 as previously described, the estimator 540 may define surfaces at the location indicated by the translation value 512 using the unlabeled depth data 522 and use the surfaces as an additional basis for estimating the rotation value 510. As another example, it is contemplated that the detection model 500, subsequent to training, may be configured to output rotation and translation values directly, or may continue to use the estimator at run time to determine the rotation value 510 and the translation value 512.

Figure 6:
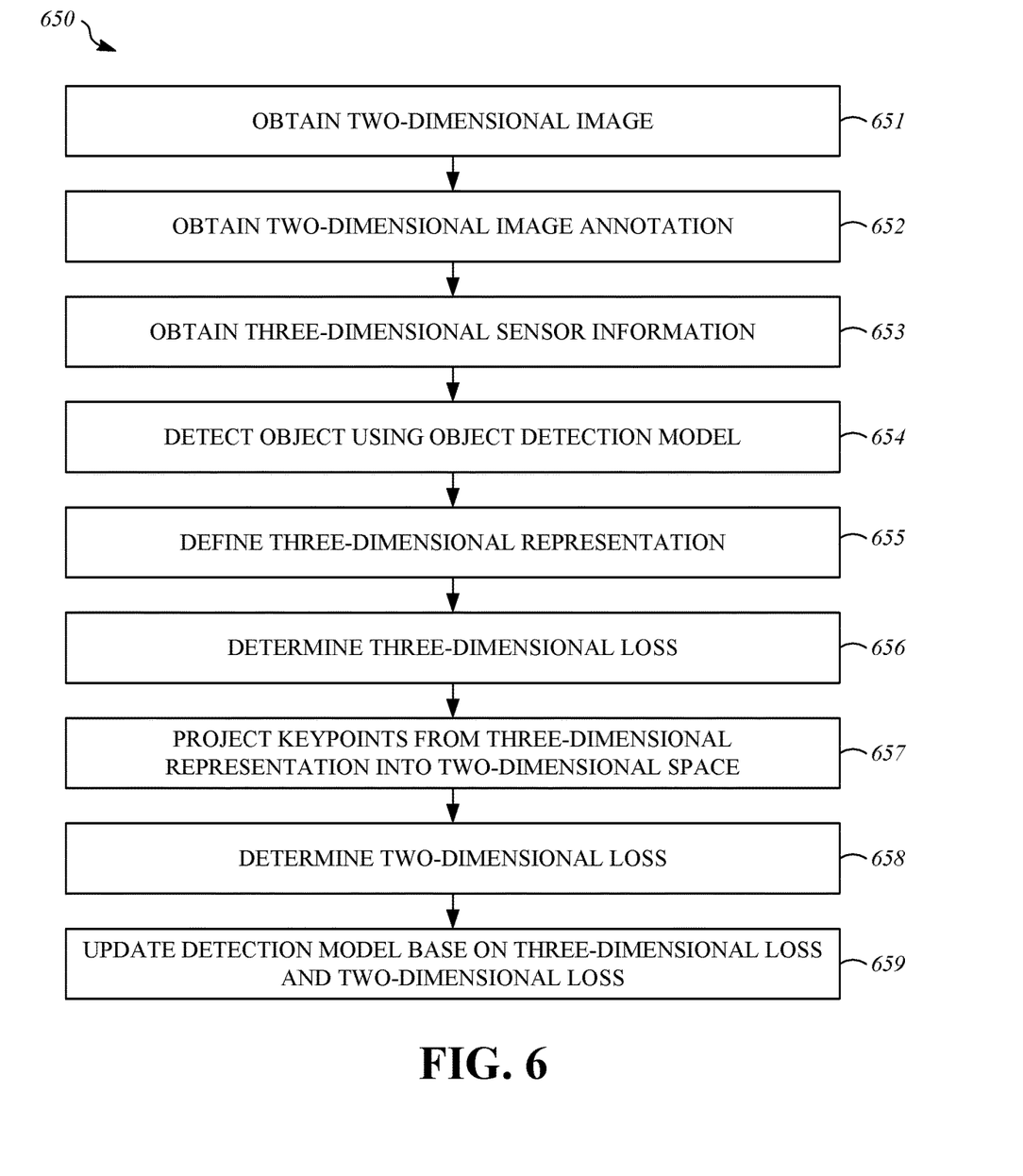
FIG. 6 is a flowchart that shows a first example of a process for training a detection model.

FIG. 6 is a flowchart that shows an example of a process 650 for training a detection model. The process 650 implements a training system, such as the training systems described with respect to FIG. 3. The process 650 can be implemented using a computing device. For example, the process 650 can implemented in the form of program instructions that are stored in a non-transitory computer-readable storage device. The program instructions are executable by one or more processors to perform the operations described herein with respect to the process 650. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 650 by the computing device. Alternatively, the process 650 can be implemented directly in hardware, firmware, or software, circuitry, or a combination thereof.

Operation 651 includes obtaining a two-dimensional image. As one example, obtaining the two-dimensional image may be performed by accessing the two-dimensional image from a storage device. As another example, obtaining the two-dimensional image may be performed by receiving the two-dimensional image in a transmission over a wired or wireless network. As another example, obtaining the two-dimensional image may be performed by receiving that two-dimensional image as an output from a camera. The two-dimensional image may be data that describes an array of pixels values. Each of the pixel values may be described by component values (e.g., RGB values, YUV values, CMYK values, HSV values, etc.). The two-dimensional image 302 is an example of the type of image that may be obtained in operation 651.

Operation 652 includes obtaining a two-dimensional image annotation that indicates presence of an object in the two-dimensional image that was obtained in operation 651.

In some implementations of the method, the two-dimensional image annotation includes keypoints that correspond to the locations of features of an object in the image. In some implementations, the two-dimensional image annotation includes bounding box that describes a location of the object with respect to the two-dimensional image and a size of the object with respect to the two-dimensional image. The keypoint annotations 327 are an examples of the two-dimensional image annotations that are obtained in operation 652.

The two-dimensional image annotation may be determined by an automated annotation process (i.e., an automated two-dimensional image annotation process). One example of an automated annotation process utilizes a trained machine-learning model to identify objects in the image, determine the spatial extents of the objects, and output bounding boxes (e.g., minimum and maximum x and y coordinate values that can be used to define a rectangle). Alternatively, the two-dimensional image annotation may be determined by a manual process. A human annotator can define information that describes the location of the object with respect to the two-dimensional image, such as by indicating locations on the image that correspond to keypoints on an object or drawing a bounding box on the image according to the spatial extents of the object within the image.

Operation 653 includes obtaining three-dimensional sensor information. The three-dimensional sensor information may be, for example, a point cloud that was collected from outputs generated by a three-dimensional sensor such as a LIDAR sensor. The three-dimensional sensor information is unlabeled, and is not processed by a manual or automated system that generates annotations for the three-dimensional sensor information prior to further use in the process 650. The unlabeled depth data 322 is an example of the three-dimensional sensor information that may be obtained in operation 653.

Operation 654 includes detecting an object using an object detection model. The object detection model may be the detection model 300 as previously described. The object detection model is configured to identify the locations of objects in image and to determine shape-related characteristics of the objects in the image. The object detection model may output any or all of bounding box coordinates, a keypoint estimate, a shape definition, a rotation value, and a translation value.

As described with respect to the detection model 300, detecting the object in operation 654 may include use of an object detection model that is configured to determine the shape definition 308, the rotation value 310, and the translation value 312 for the object that is detected in the image. When the object detection model is used at run time (as opposed to during training), the only run-time input used for this detection is a two-dimensional image (e.g., the image that was obtained in operation 651).

Operation 655 includes defining a three-dimensional representation of the object that was detected in operation 654. The three-dimensional representation may be defined using the outputs of the detection model 300, such as the shape definition 308, the rotation value 310, and the translation value 312, as described with respect to the three-dimensional representation 320.

The three-dimensional representation may include a three-dimensional model that represents that object and is defined using the shape definition 308, such as by selecting a three-dimensional model, defining a new three-dimensional model using two or more existing models, such as by combination or interpolation of the two or more existing models, or selecting parameters for a parametric model. Thus, the three-dimensional model that represents the object may be defined based on two or more models from a shape library. The three-dimensional representation also describes the position and position (e.g., translation and rotation) of the object in three-dimensional space.

Operation 656 includes determining a three-dimensional loss for the object detection that was performed in operation 654 using the three-dimensional representation that was determined in operation 655. The three-dimensional loss may be determined by comparing the three-dimensional representation 320 to the unlabeled depth data 322, as described with respect to the three-dimensional loss 324.

Operation 657 includes projecting keypoints from the three-dimensional representation into two-dimensional space to define a two-dimensional representation that is based on the three-dimensional representation. Operation 657 can be performed in the manner described with respect to the two-dimensional representation 326, which is a projection of the three-dimensional representation 320 into image space.

Operation 658 includes determining a two-dimensional loss for the object detection that was performed in operation 654. The two-dimensional loss may be determined using the two-dimensional representation 326, by comparing the two-dimensional representation 326 to the two-dimensional image annotation that was obtained in operation 652. Operation 658 may be performed, for example, as described with respect to the keypoint reprojection loss 328.

Operation 659 includes updating the detection model (e.g., the detection model 300) based on the three-dimensional detection loss that was determined in operation 656 and based on the two-dimensional detection loss that was determined in operation 658. As an example, the loss values may be used as inputs to an update algorithm that is implemented using known techniques, such as backpropagation and gradient descent. Operation 659 may be performed in the manner described with respect to the trainer 330 and the update 332.

Figure 7:
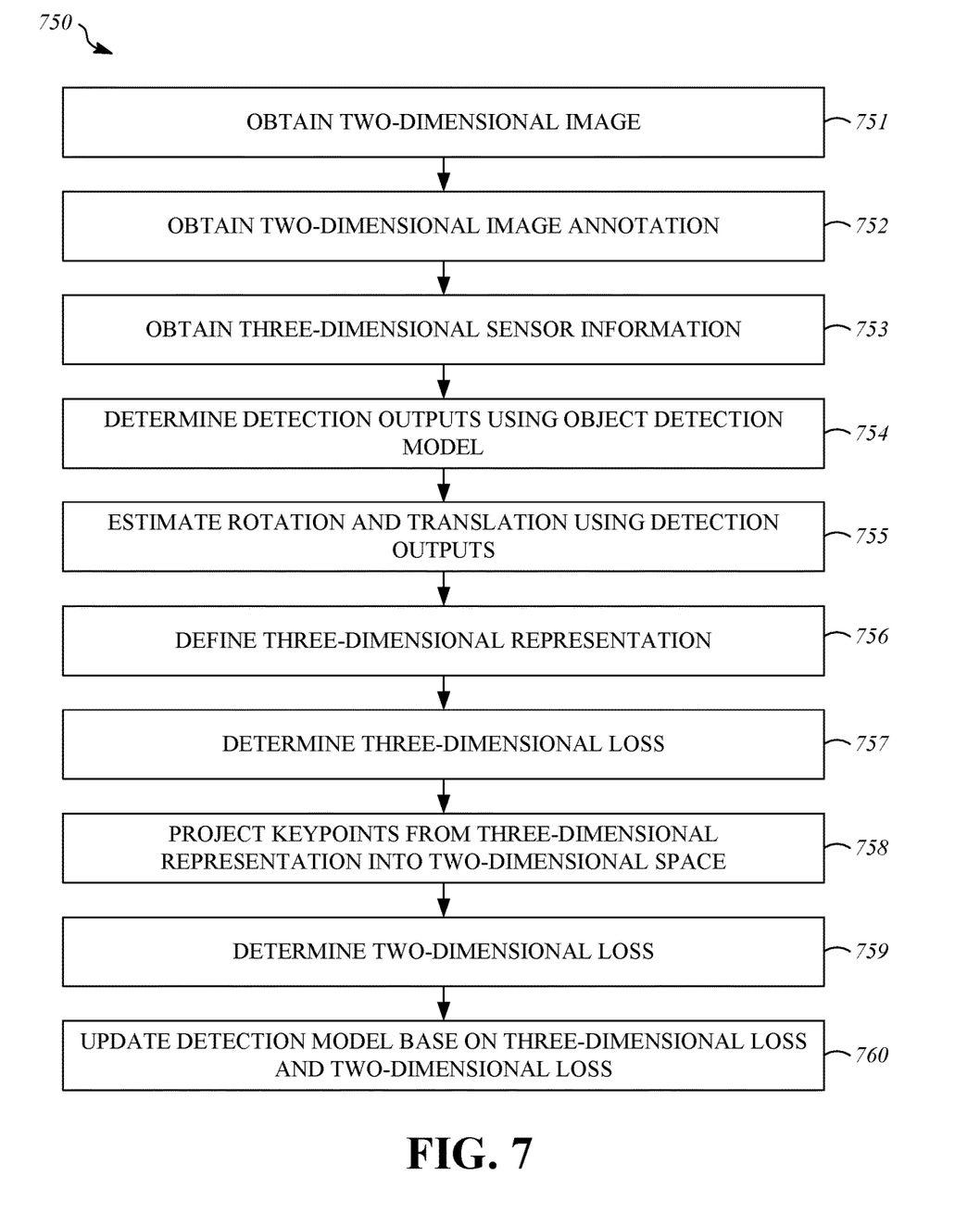
FIG. 7 is a flowchart that shows a second example of a process for training a detection model.

FIG. 7 is a flowchart that shows an example of a process 750 for training a detection model. The process 750 implements a training system, such as the training systems described with respect to FIGS. 4-5. The process 750 can be implemented using a computing device. For example, the process 750 can implemented in the form of program instructions that are stored in a non-transitory computer-readable storage device. The program instructions are executable by one or more processors to perform the operations described herein with respect to the process 750. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 750 by the computing device. Alternatively, the process 750 can be implemented directly in hardware, firmware, or software, circuitry, or a combination thereof.

Operation 751 includes obtaining a two-dimensional image. As one example, obtaining the two-dimensional image may be performed by accessing the two-dimensional image from a storage device. As another example, obtaining the two-dimensional image may be performed by receiving the two-dimensional image in a transmission over a wired or wireless network. As another example, obtaining the two-dimensional image may be performed by receiving that two-dimensional image as an output from a camera. The two-dimensional image may be data that describes an array of pixels values. Each of the pixel values may be described by component values (e.g., RGB values, YUV values, CMYK values, HSV values, etc.). The two-dimensional image 402 and the two-dimensional image 502 are examples of the type of image that may be obtained in operation 751.

Operation 752 includes obtaining a two-dimensional image annotation that indicates presence of an object in the two-dimensional image that was obtained in operation 751. In some implementations of the method, the two-dimensional image annotation includes keypoints that correspond to the locations of features of an object in the image. In some implementations, the two-dimensional image annotation includes bounding box that describes a location of the object with respect to the two-dimensional image and a size of the object with respect to the two-dimensional image. The keypoint annotations 427 and the keypoint annotations 527 are examples of the two-dimensional image annotations that are obtained in operation 752.

The two-dimensional image annotation may be determined by an automated annotation process (i.e., an automated two-dimensional image annotation process). One example of an automated annotation process utilizes a trained machine-learning model to identify objects in the image, determine the spatial extents of the objects, and output bounding boxes (e.g., minimum and maximum x and y coordinate values that can be used to define a rectangle). Alternatively, the two-dimensional image annotation may be determined by a manual process. A human annotator can define information that describes the location of the object with respect to the two-dimensional image, such as by indicating locations on the image that correspond to keypoints on an object or drawing a bounding box on the image according to the spatial extents of the object within the image.

Operation 753 includes obtaining three-dimensional sensor information. The three-dimensional sensor information may be, for example, a point cloud that was collected from outputs generated by a three-dimensional sensor such as a LIDAR sensor. The three-dimensional sensor information is unlabeled, and is not processed by a manual or automated system that generates annotations for the three-dimensional sensor information prior to further use in the process 750. The unlabeled depth data 422 and the unlabeled depth data 522 are examples of the three-dimensional sensor information that may be obtained in operation 753.

Operation 754 includes determining detection outputs using an object detection model. The detection outputs correspond to objects that are detected in the two-dimensional image that was obtained in operation 751. The object detection model may be the detection model 400 or the detection model 500 as previously described. The object detection model is configured to identify the locations of objects in image and to determine shape-related characteristics of the objects in the image. The detection outputs of the object detection model may include any or all of bounding box coordinates, a keypoint estimate, a shape definition, a rotation value, and a translation value. When the object detection model is used at run time (as opposed to during training), the only run-time input used for this detection is a two-dimensional image (e.g., the image that was obtained in operation 751).

Operation 755 includes estimating a rotation value and a translation value for the object that is represented by the detection outputs that were determined in operation 754. As one example, operation 755 can be performed as described with respect to the estimator 440, using the bounding box coordinates 404 and the shape definition 408 output by the detection model 400. As another example, operation 755 can be performed as described with respect to the estimator 540, using the keypoint estimate 506 and the shape definition 508 output by the detection model 500.

Operation 756 includes defining a three-dimensional representation of the object that was detected in operation 754 using the shape definition from the detection outputs and using the rotation value and the translation value that were estimated in operation 755. The three-dimensional representation may be defined using the outputs of the detection model 400 or the detection model 500, as described with respect to the three-dimensional representation 420 and the three-dimensional representation 520.

The three-dimensional representation may include a three-dimensional model that represents that object and is defined using the shape definition 408 or the shape definition 508, such as by selecting a three-dimensional model, defining a new three-dimensional model using two or more existing models, such as by combination or interpolation of the two or more existing models, or selecting parameters for a parametric model. Thus, the three-dimensional model that represents the object may be defined based on two or more models from a shape library. The three-dimensional representation also describes the position and position (e.g., translation and rotation) of the object in three-dimensional space.

Operation 757 includes determining a three-dimensional loss for the object detection that was performed in operation 754 using the three-dimensional representation that was determined in operation 755. The three-dimensional loss may be determined by comparing the three-dimensional representation 420 or the three-dimensional representation 520 to the unlabeled depth data 422 or the unlabeled depth data 522 as described with respect to the three-dimensional loss 424 or the three-dimensional loss 524.

Operation 758 includes projecting keypoints from the three-dimensional representation into two-dimensional space. Operation 758 can be performed in the manner described with respect to the two-dimensional representation 426 or the two-dimensional representation 526.

Operation 759 includes determining a two-dimensional loss for the object detection that was performed in operation 754. The two-dimensional loss may be determined using the two-dimensional representation 426 or the two-dimensional representation 526, by comparison to the two-dimensional image annotation that was obtained in operation 752. Operation 759 may be performed, for example, as described with respect to the keypoint reprojection loss 428 or the keypoint reprojection loss 528.

Operation 760 includes updating the detection model (e.g., the detection model 400 or the detection model 500) based on the three-dimensional detection loss that was determined in operation 756 and based on the two-dimensional detection loss that was determined in operation 759. As an example, the loss values may be used as inputs to an update algorithm that is implemented using known techniques, such as backpropagation and gradient descent. Operation 757 may be performed in the manner described with respect to the trainer 430 and the update 432 or as described with respect to the trainer 530 and the update 532.

Figure 8:
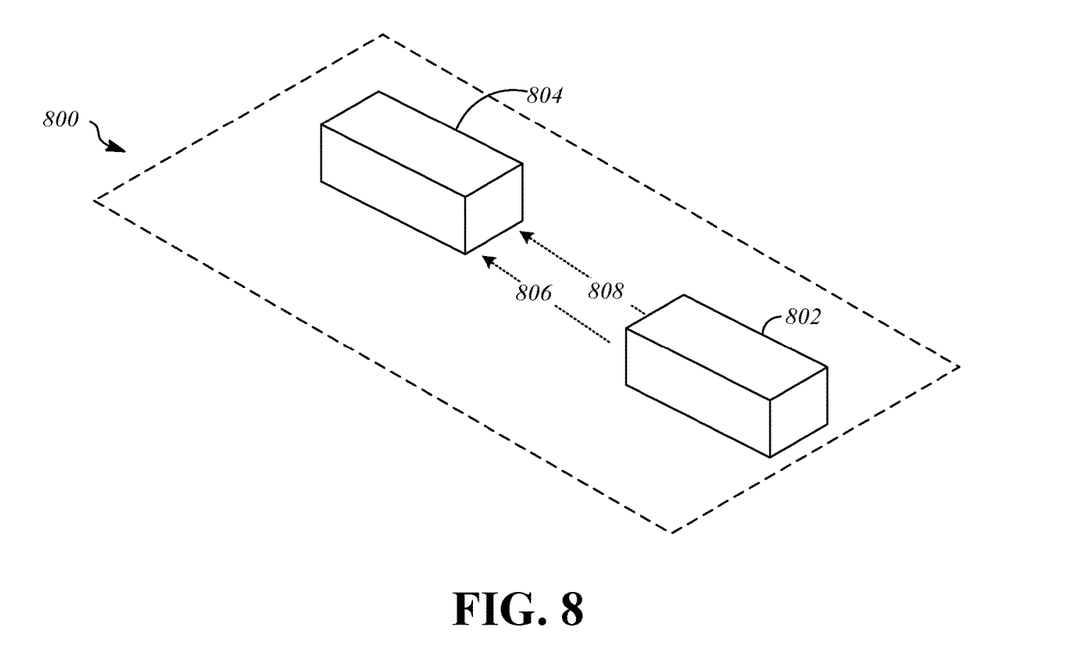
FIG. 8 is an illustration that shows an example of an object detection scenario.

FIG. 8 is an illustration that shows an example of an object detection scenario, including an environment in which a host is following an object. It is also an example of a scenario in which information can be obtained that is useful for training machine-learning based object detection systems. Object detection can be applied to a wide variety of tasks. One example is vehicle detection. In the illustrated example, the environment includes a road 800, the host is a host vehicle 802 and the object is a subject vehicle 804.

The host vehicle 802 may be a vehicle that is using outputs from an object detection system for the purpose of making control decisions in the context of automated control of vehicle motion, and the subject vehicle 804 may be another vehicle that is located in the vicinity of the host vehicle 802.

The host vehicle 802 includes sensor systems that can obtain information that is usable to determine the presence of the subject vehicle 804. This information can be used for real-time sensing applications. For example, the information obtained by the sensor systems can be used by an on-board autonomous driving system of the host vehicle 802, or for subsequent processing by a separate system.

The sensor information that is obtained by the host vehicle 802 can include two-dimensional sensor outputs 806 and three-dimensional sensor outputs 808. As an example, the two-dimensional sensor outputs can be images from a still camera or a video camera that obtains visible spectrum images or infrared spectrum images. As an example, the three-dimensional sensor outputs 808 can be three-dimensional point clouds obtained from a lidar sensor, a structured-light-stereo sensor, or any other suitable three-dimensional sensing system.

Figure 9:
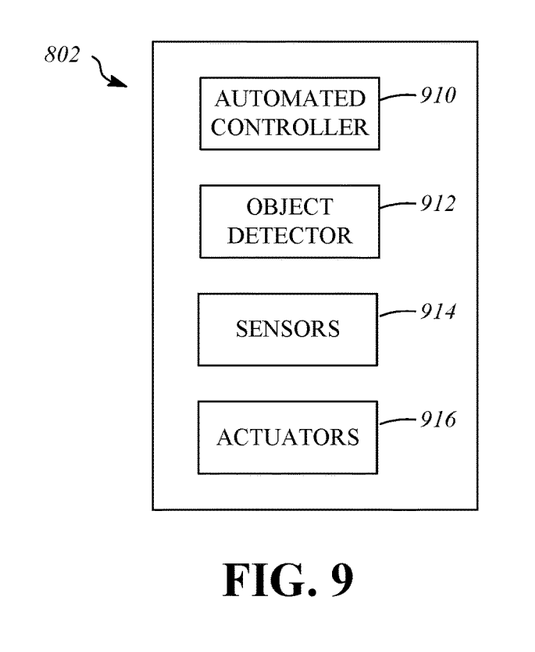
FIG. 9 is a block diagram of a host vehicle.

FIG. 9 is a block diagram of the host vehicle 802. The host vehicle 802 includes an automated controller 910, an object detector 912, sensors 914, and actuators 916.

The automated controller 910 is a system that makes control decisions for the host vehicle 802 based on inputs. The automated controller 910 may be implemented in the form of software that is executed by a computing device including any or all of a circuit, a processor, and a memory device.

The object detector 912 is a system that is able to determine the positions of objects near the host vehicle 802. As an example, the object detector 912 may be implemented using a trained machine learning system, which can be or include a deep neural network (DNN).

The sensors 914 can include cameras, radar sensors, lidar sensors, and other types of sensors. The outputs of the sensors 914 can be used by the object detector 912 for real-time sensing applications and/or can be stored for later use. When stored for later use, sensor outputs from the sensors 914 can be associated with timestamps that indicate the moment in time at which the information was perceived by the sensors 914. The timestamps can be coordinated across different types of sensors in order to allow different types of sensor outputs to be compared and used jointly during subsequent processing.

The actuators 916 are devices that cause and control motion of the host vehicle 802, such as suspension actuators, steering actuators, braking actuators, and propulsion actuators. The automated controller 910 is operable to control motion of the host vehicle 802 by outputting commands to the actuators 916.

Figure 10:
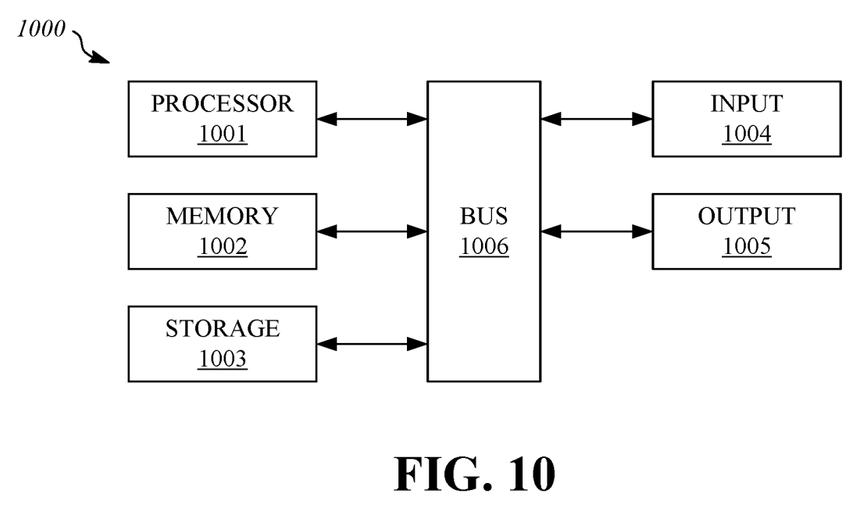
FIG. 10 is an illustration that shows an example of a hardware configuration for a computing device.

FIG. 10 is an illustration that shows an example of a hardware configuration for a computing device that can be used to implement computing devices that execute the systems and methods described herein. The computing device 1000 may include a processor 1001, a memory 1002, a storage device 1003, one or more input devices 1004, and one or more output devices 1005. The computing device 1000 may include a bus 1006 or a similar device to interconnect the components for communication. The processor 1001 is operable to execute computer program instructions and perform operations described by the computer program instructions. As an example, the processor 1001 may be a conventional device such as a central processing unit. The memory 1002 may be a volatile, high-speed, short-term information storage device such as a random-access memory module. The storage device 1003 may be a non-volatile information storage device such as a hard drive or a solid-state drive. The input devices 1004 may include any type of human-machine interface such as buttons, switches, a keyboard, a mouse, a touchscreen input device, a gestural input device, or an audio input device. The output devices 1005 may include any type of device operable to provide an indication to a user regarding an operating state, such as a display screen or an audio output.

As described above, one aspect of the present technology is the gathering and use of data available from various sources to detect objects using two-dimensional images. The present disclosure contemplates that in some instances, this gathered data may include personal information data that uniquely identifies or can be used to contact or locate a specific person. Such personal information data can include location-based data, images, addresses, so forth.

The present disclosure recognizes that the use of such personal information data, in the present technology, can be used to the benefit of users. For example, the personal information data can be used to identify specific objects in the user's environment to facilitate autonomy features.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of object detection, the present technology can be configured to allow users to select to "opt in" or "opt out" of participation in the collection of personal information data during registration for services or anytime thereafter. In another example, users can select not to provide personal information for use in aiding object detection. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, object detection can be based on non-personal information data or a bare minimum amount of personal information, such as the content being requested by the device associated with a user, other non-personal information available to the object detection system, or publicly available information.

What is claimed is:

1. A method, comprising:
   obtaining a two-dimensional image that represents a scene;
   obtaining three-dimensional sensor information that represents the scene and is captured at the same time as the two-dimensional image;
   determining a detection output that represents an object in the two-dimensional image using a detection model, wherein the detection model is a machine-learning based model, and the detection output includes a shape definition that describes a shape and size of the object;
   defining a three-dimensional representation based on the shape definition by placing a three-dimensional model that represents the object in three-dimensional space according to a position and a rotation;
   determining a three-dimensional detection loss that describes a difference between the three-dimensional representation and the three-dimensional sensor information; and
   training the detection model using the three-dimensional detection loss.

2. The method of claim 1, wherein the position and the rotation are estimated based on the detection output.

3. The method of claim 1, wherein the detection output includes at least one of bounding box coordinates or a keypoint estimate.

4. The method of claim 1, wherein the position and the rotation are included in the detection output.

5. The method of claim 1, wherein the three-dimensional sensor information is unlabeled.

6. The method of claim 1, wherein the three-dimensional model that represents the object is defined by combining a first three-dimensional model from a shape library with a second three-dimensional model from the shape library.

7. The method of claim 1, wherein the three-dimensional detection loss is determined based on chamfer loss between the three-dimensional representation and the three-dimensional sensor information.

8. The method of claim 1, further comprising:
   obtaining a two-dimensional image annotation that indicates presence of the object in the two-dimensional image;
   projecting features from the three-dimensional representation into two-dimensional space to define a two-dimensional representation; and
   determining a two-dimensional detection loss based on the two-dimensional representation and the two-dimensional image annotation,
   wherein training the detection model is further based on the two-dimensional detection loss.

9. The method of claim 1, wherein the shape definition defines the three-dimensional model that represents the object based on one or more pre-existing three-dimensional models that are selected from a shape library by the detection model based on the two-dimensional image.

10. A non-transitory computer-readable storage device including computer-interpretable program instructions, wherein the computer-interpretable program instructions, when executed by one or more computing devices, cause the one or more computing devices to perform operations, the operations comprising:
    obtaining a two-dimensional image that represents a scene;
    obtaining three-dimensional sensor information that represents the scene and is captured at the same time as the two-dimensional image;
    determining a detection output that represents an object in the two-dimensional image using a detection model, wherein the detection model is a machine-learning based model, and the detection output includes a shape definition that describes a shape and size of the object;
    defining a three-dimensional representation based on the shape definition by placing a three-dimensional model that represents the object in three-dimensional space according to a position and a rotation;
    determining a three-dimensional detection loss that describes a difference between the three-dimensional representation and the three-dimensional sensor information; and
    training the detection model using the three-dimensional detection loss.

11. The non-transitory computer-readable storage device of claim 10, wherein the position and the rotation are estimated based on the detection output.

12. The non-transitory computer-readable storage device of claim 10, wherein the detection output includes at least one of bounding box coordinates or a keypoint estimate.

13. The non-transitory computer-readable storage device of claim 10, wherein the position and the rotation are included in the detection output.

14. The non-transitory computer-readable storage device of claim 10, wherein the three-dimensional sensor information is unlabeled.

15. The non-transitory computer-readable storage device of claim 10, wherein the three-dimensional model that represents the object is defined by combining a first three-dimensional model from a shape library with a second three-dimensional model from the shape library.

16. The non-transitory computer-readable storage device of claim 10, wherein the three-dimensional detection loss is determined based on chamfer loss between the three-dimensional representation and the three-dimensional sensor information.

17. The non-transitory computer-readable storage device of claim 10, further comprising:
obtaining a two-dimensional image annotation that indicates presence of the object in the two-dimensional image;
projecting features from the three-dimensional representation into two-dimensional space to define a two-dimensional representation; and
determining a two-dimensional detection loss based on the two-dimensional representation and the two-dimensional image annotation,
wherein training the detection model is further based on the two-dimensional detection loss.

18. The non-transitory computer-readable storage device of claim 10, wherein the shape definition defines the three-dimensional model that represents the object based on one or more pre-existing three-dimensional models that are selected from a shape library by the detection model based on the two-dimensional image.

19. A system, comprising:
a memory; and
a processor configured to execute instructions stored in the memory to:
obtain a two-dimensional image that represents a scene;
obtain three-dimensional sensor information that represents the scene and is captured at the same time as the two-dimensional image;
determine a detection output that represents an object in the two-dimensional image using a detection model, wherein the detection model is a machine-learning based model, and the detection output includes a shape definition that describes a shape and size of the object;
define a three-dimensional representation based on the shape definition by placing a three-dimensional model that represents the object in three-dimensional space according to a position and a rotation;
determine a three-dimensional detection loss that describes a difference between the three-dimensional representation and the three-dimensional sensor information; and
train the detection model using the three-dimensional detection loss.

20. The system of claim 19, wherein the position and the rotation are estimated based on the detection output.

21. The system of claim 19, wherein the detection output includes at least one of bounding box coordinates or a keypoint estimate.

22. The system of claim 19, wherein the position and the rotation are included in the detection output.

23. The system of claim 19, wherein the three-dimensional sensor information is unlabeled.

24. The system of claim 19, wherein the three-dimensional model that represents the object is defined by combining a first three-dimensional model from a shape library with a second three-dimensional model from the shape library.

25. The system of claim 19, wherein the three-dimensional detection loss is determined based on chamfer loss between the three-dimensional representation and the three-dimensional sensor information.

26. The system of claim 19, further comprising:
obtaining a two-dimensional image annotation that indicates presence of the object in the two-dimensional image;
projecting features from the three-dimensional representation into two-dimensional space to define a two-dimensional representation; and
determining a two-dimensional detection loss based on the two-dimensional representation and the two-dimensional image annotation,
wherein training the detection model is further based on the two-dimensional detection loss.

27. The system of claim 19, wherein the shape definition defines the three-dimensional model that represents the object based on one or more pre-existing three-dimensional models that are selected from a shape library by the detection model based on the two-dimensional image.

* * * * *